(No Model.) 2 Sheets—Sheet 1.

M. RILEY.
LIFE GUARD FOR STREET RAILWAY CARS.

No. 542,836. Patented July 16, 1895.

Witnesses
H. B. Bradshaw
A. L. Phelps

Inventor
Michael Riley
By his Attorney
C. C. Shepherd (No Model.) 2 Sheets—Sheet 2.

M. RILEY.
LIFE GUARD FOR STREET RAILWAY CARS.

No. 542,836. Patented July 16, 1895.

Witnesses
H. B. Bradshaw
A. L. Phelps

Inventor
Michael Riley
By his Attorney
C. C. Shepherd

UNITED STATES PATENT OFFICE.

MICHAEL RILEY, OF LONDON, OHIO.

LIFE-GUARD FOR STREET-RAILWAY CARS.

SPECIFICATION forming part of Letters Patent No. 542,836, dated July 16, 1895.

Application filed March 25, 1895. Serial No. 543,019. (No model.)

*To all whom it may concern:*

Be it known that I, MICHAEL RILEY, a citizen of the United States, residing at London, in the county of Madison and State of Ohio, have invented a certain new and useful Improvement in Life-Guards for Street-Railway Cars, of which the following is a specification.

My invention relates to the improvement of life-guards for street-railway cars; and the objects of my invention are to provide an improved guard of this class of superior construction and arrangement of parts, to so construct the same as to readily and safely clear a track from obstructions, and to produce other improvements, the details of construction and arrangement of which will be more fully pointed out hereinafter. These objects I accomplish in the manner illustrated in the accompanying drawings, in which—

Figure 1:
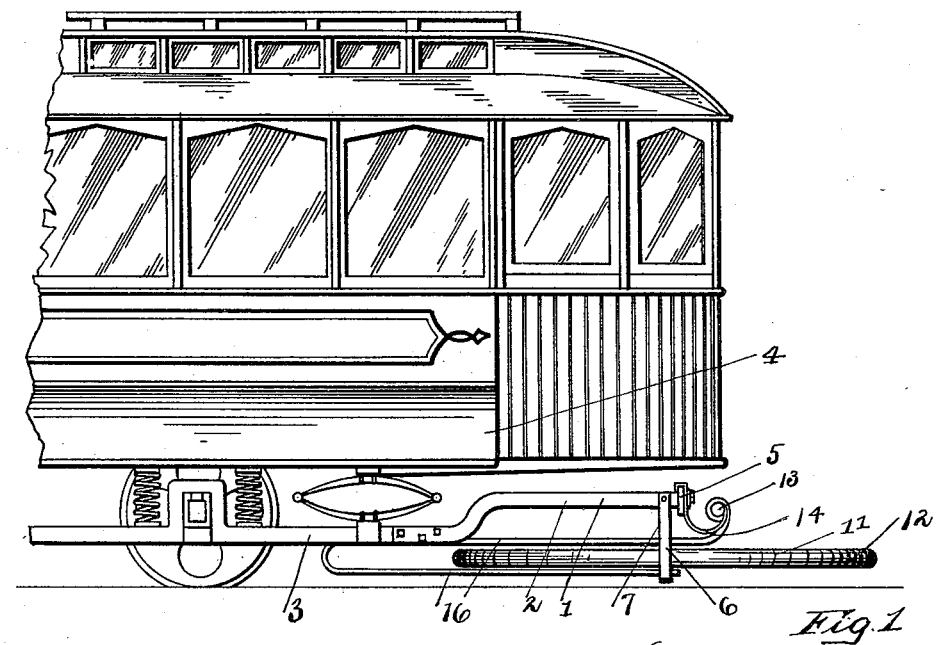
Figure 2:
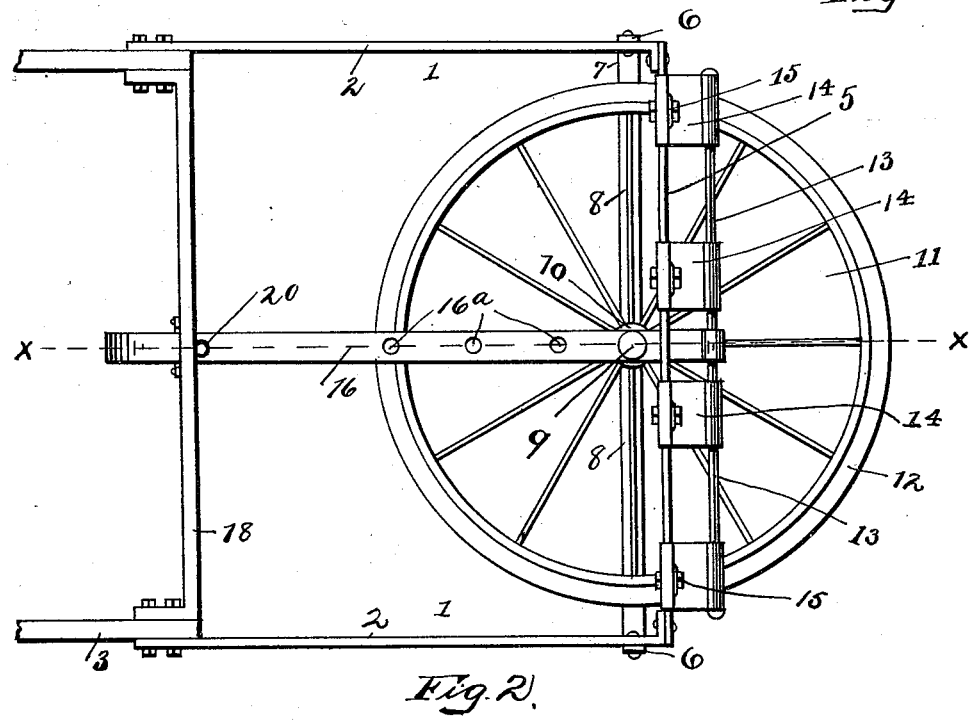
Figure 3:
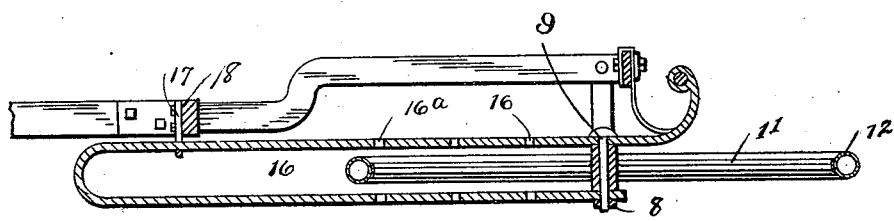
Figure 4:
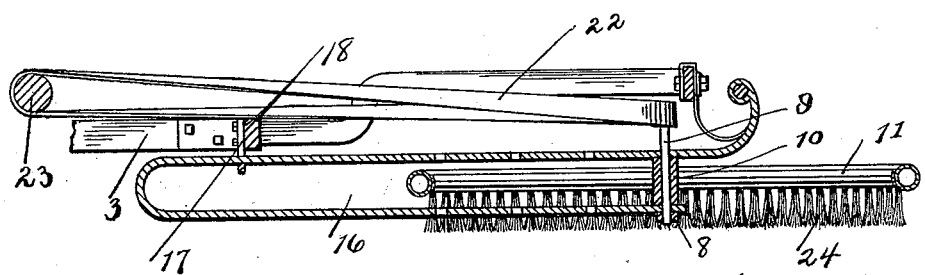

Figure 1 is a side elevation of a portion of a car having my improvement thereon. Fig. 2 is a plan view of the guard. Fig. 3 is a sectional view of said guard, taken on line $x\,x$ of Fig. 2; and Fig. 4 is a similar sectional view showing the device when adapted for use as a sweeper.

Similar numerals refer to similar parts throughout the several views.

In attaining the objects set forth I employ a horizontally-supported guard-wheel which, as hereinafter described, is journaled in a suitable frame beneath the forward end portion of a car body or platform, said wheel being adapted to be rotated by contact with a body or other obstruction on a track and by said rotary movement and contact to force said body to one side of the track and out of the way of the car with which the wheel is connected.

In carrying out my invention I employ a rigid frame-piece 1, which, as indicated in the drawings, consists of parallel side bars 2, the rear ends of which are secured to the forward end portions of the usual truck side bars 3 of a car 4. The forward and smaller end portions of these side arms 2 are connected by a transverse forward end bar 5. To the sides of the frame or bracket 2 thus formed, and adjacent to the forward end thereof, are pivoted the vertical arms 6 of a stirrup or hanger 7, the horizontal arm 8 of which extends beneath and parallel with the front bar 5 of the frame 1. Through the center of the length of the hanger-arm 8 projects loosely the lower end of a vertical pin 9 on which is journaled the hub 10 of a horizontally-supported guard-wheel 11, said guard-wheel being thus loosely embraced between the hanger-arm 8 and frame-bar 5. In the construction of this wheel 11, I preferably provide the same with a cushion or pneumatic tire 12 of rubber or other suitable pliable material.

13 represents a transverse rod, which, as shown in the drawings, is supported from and in front of the forward frame-bar 5, and which is connected at intervals with said frame-bar by means of spring-strips 14, these spring-strips being, as shown, in the form of doubled or looped spring-plates, one end of each of which is looped about the rod 13 and the remaining end of which is rigidly connected with the forward frame-bar 5, as indicated at 15.

16 represents a yoke which, as shown in the drawings, has substantially the form of an elongated U-shaped bar, the upper arm of which has its forward end looped or otherwise connected with the central portion of the rod 13. From this point said yoke-bar extends rearwardly and passes loosely through a slotted opening 17 formed in a transverse truck-bar 18, which connects, as shown, the forward end portions of the side truck-bars 3. The lower arm of the yoke 16 has its forward end secured, as shown, on the upper side of the hanger-arm 8, and has the lower end of the pin or shaft 9 fixed therein. The vertical hub-pin 9 passes loosely through the desired one of a number of pin-openings $16^a$, formed in the upper arm of the yoke 16, said pin having an enlarged head, which rests on said yoke-arm. In the rear portion of the upper arm of the yoke 16, I provide, for the purpose hereinafter set forth, an opening 20.

As indicated in the drawings, the position of the wheel 11 is such as to cause a portion of said wheel to project beyond the end of the car or platform, thus insuring the contact of said wheel with an obstacle on a track before said obstacle is struck by the body of the car.

From the construction and operation which I have herein shown and described it will be observed that the pin on which the wheel-hub is mounted is supported in a resilient or yielding frame, this frame being composed of the spring-supported rod 13, the pivoted hanger 7, and longitudinally-movable yoke 16. It is therefore evident that the yielding action of this frame which must result when the wheel is brought into sudden contact with a body will operate to relieve said body to some extent from the effects of the sudden shock which might otherwise occur.

Owing to the curve of the wheel-tire and the fact that said wheel is journaled centrally, it will be seen that contact of the tire with a body on the track will not only result in a forcing of said body from the track but in a rotation of the wheel, which rotation will greatly assist in forcing the body outward.

Although it is evident that each end of a car might be provided with my improved guard-wheel and its supporting framework, it will readily be seen that by providing both ends of the car with the framework the pin 9 may be withdrawn and the wheel 11 journaled at either end of a car, thus necessitating the employment of but one of said wheels.

In case it becomes desirable to retain the wheel-supporting frame in a substantially rigid position by preventing any longitudinal movement of the yoke 16, I may insert a suitable stop-pin in the opening 20 of the yoke, said pin serving by contact with the bar 18 to prevent the inward movement of said yoke.

As illustrated in Fig. 4 of the drawings, I may so construct and arrange the parts of my device as to facilitate its use as a track-sweeping mechanism. In order to accomplish this last-named object the pin 9 is provided with an upward extension which, as indicated at 22, has a belt connection with the axle 23 of the car. The wheel hub 10 is in this case keyed or otherwise connected with the pin 9, and the under side of the wheel-felly is provided, as indicated at 24, with downwardly-projecting brush fibers.

From the construction last described it will be seen that the rotary motion of the axle 23 must result in a consequent rotary motion of the wheel 11, and the contact of the brushes of the latter with the track and intervening paving will result in the complete sweeping or cleansing of the latter.

Having now fully described my invention, what I claim, and desire to secure by Letters Patent, is—

1. In a life guard for street cars the combination with a car body and truck framework, of a spring frame supported from said truck frame and a bumper wheel horizontally journaled in said spring frame, substantially as and for the purpose specified.

2. In a life guard for street cars the combination with a car body and its truck frame, of a spring frame supported from said truck frame and a bumper wheel detachably and adjustably supported in said spring frame, substantially as and for the purpose specified.

3. In a life guard for street cars the combination with a car body and truck frame, of a truck frame extension 1, a hanger pivotally connected with and suspended from said frame extension, a rod 13 having a spring connection with the frame extension 1, a yoke one arm of which is connected with said rod 13 and the remaining arm of which is connected with said hanger and a bumper wheel rotatively supported between the arms of said yoke, substantially as and for the purpose specified.

MICHAEL RILEY.

In presence of—
C. C. SHEPHERD,
C. W. VOORHEES.